United States Patent [19]
Krause et al.

[11] Patent Number: 5,455,827
[45] Date of Patent: Oct. 3, 1995

[54] MULTI-PROCESSING AND DIRECT ROUTING OF SIGNALLING PROTOCOLS IN VOICE COMMUNICATION CHANNELS

[75] Inventors: Donald J. Krause, El Cerrito; Jason W. Dove; David S. Dayner, both of Novato, all of Calif.

[73] Assignee: Harris Corporation, Melbourne, Fla.

[21] Appl. No.: 201,476

[22] Filed: Feb. 23, 1994

[51] Int. Cl.⁶ .................................................. H04Q 9/02
[52] U.S. Cl. ........................... 370/68.1; 379/229; 379/268
[58] Field of Search ................................. 370/58.1, 58.2, 370/58.3, 68.1, 110.1; 379/229, 231, 242, 268, 269, 311

[56] References Cited

U.S. PATENT DOCUMENTS 5,260,990 11/1993 McLampy et al. ...................... 379/229
5,319,640 6/1994 Yamasaki et al. ...................... 370/68.1
5,321,744 6/1994 Madonna et al. ....................... 379/268

*Primary Examiner*—Benedict V. Safourek
*Attorney, Agent, or Firm*—Joel I. Rosenblatt

[57] ABSTRACT

A switch provides time multiplex connections between ports in a telephone system. These connections are organized according to protocols located in software programs on an Integrated Multi-Protocol Processing unit (IMP). IMP includes several processing systems for processing the several protocols received by the telephone switch. Each of these IMP's then processes the respective protocol to produce switching control information. This switching control information is then transmitted to the telephone switch on a separate communications channel. The switch then uses this process protocol information to establish and remove telephone connections, according to the particular protocol received.

12 Claims, 4 Drawing Sheets

MULTI-PROCESSING AND DIRECT ROUTING OF SIGNALLING PROTOCOLS IN VOICE COMMUNICATION CHANNELS

FIELD OF THE INVENTION

This invention relates to communications switches used for transmitting voice and data information, where processing of information according to defined protocols or data formats are required.

BACKGROUND OF THE INVENTION

Communication switches, as commonly used in telephone equipment are well known. An example is shown in U.S. Pat. No. 4,688,212 *Centralized Image Response of Telephone Time Slot Interchange System.* Such systems are typically divided into two parts. The first part is the central processing unit or the CPU. The CPU provides the functions of digit analysis, routing algorithms, special features such as speed dialing and billing or call authorization. A second part of the telephone switch generally identified as a Switching Unit provides the functions of call processing including port or slot switching and the transmission of PCM or voice data or signaling data to the designated ports or slots. Certain direct functions, as are well known, are performed by the Switching Unit. These are provision of an off hook signal, digit manipulation, and call acknowledgment.

The CPU provides disk storage, a master processing unit (MPU), a bus master arbiter to control transmissions from the main processing unit to the Switching Unit (C Bus service unit) and a serial bus interface unit (SBIU) controlling the information within the modules of the MPU.

In the Switching Unit, a Telephone Switching Unit (TSU) and signal Switching Unit (SSU) provides access between the slots or ports in the telephone switch for external connection of the telephone switch to a central office or to other ports or slots in the telephone switch. For example, the TSU may provide a direct connection for PC voice and signaling information to a peripheral card which may connect externally to a digital trunk unit such as T1 unit as used in the U.S. or an E1 unit as used internationally, for connection to central offices, or direct connection to another port or slot. The SSU may provide a direct connection to another port in that SSU or to another port connected to another SSU within the switch or for the external connection to that port or slot in another SSU or TSU.

In the process of using a telephone switch, information may be received from an external source, such as a T1 trunk. This information may be in the form of a designated communication protocol required to be interpreted in terms of that designated protocol by the telephone switch. That interpreted protocol may then be used to construct or remove connections for telephone communications transaction. Accordingly, information received from an external source may be required to be interpreted as protocols by software programs in the telephone switch. Provision for adding or deleting these software programs relating to these protocols and for interpreting the information processed from these protocols should be made available and easy to add, delete or change. After processing of the protocol information, there is a requirement for transmitting the processed information from the Switching Unit to the central processing unit. This communication using the buses internal to the telephone switch for communicating the processed or interpreted protocol information between the Switching Unit and the central processing unit reduces the speed of the telephone switch.

As seen, information may be received relating to particular communications protocols. This protocol information is processed and then the processed information is used by the telephone switch, for example, to establish and reduce circuit switch telephone calls and complete transactions. As protocols change and a telephone switch is required to process a plurality of protocols, a capability for modularly adding protocols and the equipment for processing the information within the protocols facilitates use of the switch. Additionally, a telephone processor should have capability for transmission of the processed protocol information to its central processor where that information is designated for use in establishing telephone routing within the switch.

SUMMARY OF THE INVENTION

This invention provides on board processing capability for receiving and processing information over voice communication channels from the telephone switch and for providing the processed information from the Switching Unit to the central processing unit, for processing of the call.

As shown in the preferred embodiment, a telephone switch contains a central processing unit (CPU) and a Switching Unit. The CPU contains a main processing unit (MPU), disk storage, a telephone processing unit (TPU) for processing switching information for use by the Switching Unit, an auxiliary processing unit and a bus shown in the preferred embodiment as a C bus. A C bus service unit controls the exchange of information between the central processing unit and the Switching Unit, over an R bus, as shown.

The Switching Unit contains a Telephone Timing Unit (TTU) for clocking information transmitted between the Switching Unit and the central processing unit and for clocking the information received from the central processing unit to the Switching Unit's T bus, a Conference and Tones Unit (CTU), and a Telephone Switching Unit (TSU) and a Signaling Switching Unit (SSU). The Telephone Switching Unit (TSU) and the Signaling Switching Unit (SSU) control the switching and signaling of information over designated slots or ports. These slots or ports are used in the external connection of the switch. In the preferred embodiment, the SSU and the TSU are connected to one or more peripheral cards which interface directly with such slots and ports for external connection such as to a central office or to another telephone or data source connected to the telephone switch through its designated port or slot, peripheral card and SSU and TSU.

A more complete description of such a telephone switch as may be used to practice the invention as shown in U.S. Pat. 4,688,212, Centralized Image Response of Telephone Time Slot Interchange System.

In the preferred embodiment, a peripheral card provides an interface between the telephone switch slots or ports and external connections, such as telephone sets or a T1 trunk.

According to the inventive principles as shown in the preferred embodiment, the peripheral card is used to contain a Packet Control Unit (PCU). The PCU on the peripheral card and the PCU is connected to the back plane of the Switching Unit facilitating access and additions, deletions or changes. The connection of the PCU on the peripheral card to the Switching Unit back plane is similar to the connection of T1 or E1 peripheral cards for connection to T1 or E1 trunk lines, as is well known in the art.

A modularity is achieved according to the inventive principles and as shown for the preferred embodiment, by providing the PCU on a peripheral card and accessible in the same way as trunk T1 or E1 cards are accessible. The PCU communicates through the TSU to the telephony bus. In the preferred embodiment, the PCU contains a plurality of designated PCU slots and each PCU slot is connected through the TSU to a telephone switch port or telephone switch slot. The PCU slots are used for containing IM processor (IMP). Each IMP has a program for processing a designated protocol. Each IMP may be designated with a slot or port address and may be connected to one or more slots or ports.

In the preferred embodiment, each of the PCU's is configured for 32 ports or slots at a rate of 64 kbps for each slot. The maximum data rate for a PCU in the preferred embodiment is 2.048 Mbps, representing 32 slots or ports at 64 kbps each.

The PCU may be connected to the central processing unit through the SBIU by an Ethernet LAN or other LAN. In the preferred embodiment, the Ethernet LAN runs at 10 Mbps.

The PCU includes IM bus buffers for connections to the telephony bus in the Switching Unit, slots for each IMP, a slot for an Ethernet module for transmitting the information processed from the IMP's to the central processing unit (CSU) of the telephone switch, a bus control and IMP processors, as may be used for the protocols which require processing.

Each IMP contains a central processor, a flash prom containing a boot program, a DRAM containing a protocol processing program and a field programmable gate array (FPGA).

An Ethernet module (ENET) includes a central processor, a field programmable gate array, and an SRAM and IM bus buffers for processing the information from each IMP module from the IM bus onto the LAN.

In operation, the telephone switch, as shown for the preferred embodiment may be connected by its numbered slots or ports to designated external connections, such as T1 trunk, telephone extensions, or designated protocols. Some of these protocol slots or ports may be used for the signaling system information such as No. 7(SS7) as specified in the ITU-T documents numbered Q.701–Q.704. This information is then processed within an IMP module containing a program for processing the designated protocol, such as SS7, and located on the PCU card. The processed information such as processed SS7 information, is then transmitted to the MPU within the CPU over the dedicated LAN. The information is then used by the CPU for constructing or removing telephone transactions. The protocols and the use of the protocols are well known and for that reason are not discussed in detail.

Accordingly, what is shown is a telephone switch having a central processing unit (CPU) and a Switch Unit. The telephone switch has located within its Switch Unit and on the peripheral cards, IMP processors arranged to receive designated protocols for processing and use of that processed information by the CPU. Located in the switch section are IMP modules which are used for interpreting the protocols. These IMPs may be altered or changed without affecting the CPU or the switch, portion of the telephone switch.

The processed information may be transmitted directly to the central processor for use in constructing telephone transactions directly avoiding the communications path used by the CPU and Switching Unit. In the preferred embodiment, communications path is shown as the R Bus, providing voice and data paths between the Switching Unit and the CPU.

The Switch is connected through its slots to external lines such as T1 digital trunks. These external lines may be dedicated to communications and related control information. The dedicated line for the control information may carry a plurality of protocols, transmitted as high level data link control protocols in packet format.

DESCRIPTION OF THE PREFERRED EMBODIMENT

Figure 1:
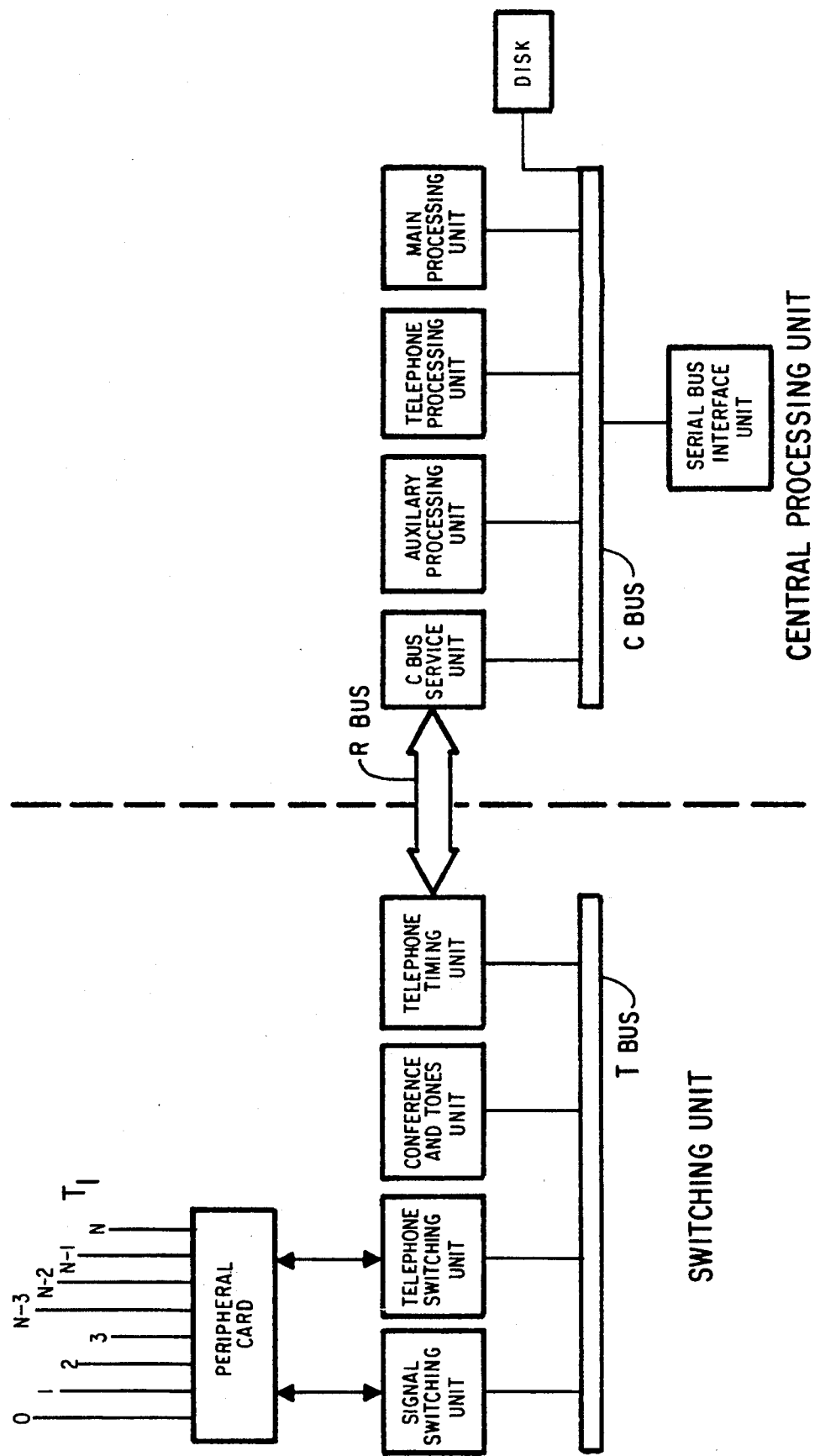
FIG. 1 shows a telephone switch system including the Switching Unit (SU) and the Central Processing Unit (CPU) with communications provided by an R Bus, and with the Switching Unit connected through a peripheral card through telephone switch port connections to external sources of data and information.

As shown in FIG. 1., a Telephone Interchange Unit or Switch is shown simplified for explanation purposes as having a centralized processing unit (CPU) and a Switching Unit (SU). As shown, the SU and CPU communicate through an R bus. Control over the R bus is by a C bus service unit (CSU) shown connected to the C bus within the central processing unit. Information may be clocked onto the T bus in the Switching Unit through the Telephone Timing Unit (TTU). Additional functions provided in the central processing unit and shown connected to the C bus are a main processing unit (MPU), and telephone processing unit (TPU), an auxiliary processing unit (APU) for providing auxiliary processing functions, a serial bus interface unit (SBIU) and disk storage.

The centralized processing unit provides, through the MPU, digit analysis, routing algorithms, special features, such as speed dialing, billing and call authorization.

The TPU within the centralized processing unit provides telephone switching information for construction or removal of call transactions made through the Switching Unit, as explained below.

The Switching Unit as shown includes a T bus for communications between the TTU, as explained above, a Conference and Tones Unit (CTU), and a signaling switch unit and a telephone switch unit (SSU, TSU). The ports or slots of the switch, 0 through N for example, may be connected through a peripheral card such as a T1 card as shown in FIG. 1. to the SSU and TSU. The function of the SSU and TSU is to complete call connections and arrange call transactions between any of the slots or ports 0 through N on the peripheral card T1, or to slots or ports on other peripheral cards connected to that SSU/TSU or to another SSU/TSU.

As would be understood by those skilled in the art, the peripheral card connected to a single SSU, TSU unit for switching between ports or slots is shown as representative, it being understood that the plurality of such peripheral cards and SSU and TSU capability may be included with any telephone interchange unit, as is well known by those skilled in the art.

As known to those skilled in the art, the peripheral card connections 0 through N are connected through ports or slots and to external connections such as central offices, trunk lines, or to other telephone sets. It is the function of the TSU in the preferred embodiment to connect the slots or ports according to the information received on any one particular line 0 through N. In the preferred embodiment, PCM voice information is provided to the TSU and signaling information may be provided through the SSU. The signaling information transmitted through the SSU in the preferred embodiment is an 8 kilobyte per second rate as compared to the 64 kilobit per second PCM voice data rate for information transmitted through the TSU. In the preferred embodiment, signaling information is used in connection with telephone or data sets dedicated to the Switching Unit.

Information is transmitted by the T bus and through the R bus to the TPU and MPU within the CPU. The CPU receiving the information does digit analysis, performs routing algorithms, and provides special features such as speed billing and call authorization. Information related to call construction for call transactions to the telephone switch are produced within the TPU and are transmitted to the TSU where connections are made in accordance to the data or instructions received from the information in the received call, the TPU and MPU and the data from the IMP, as explained below.

Figure 2:
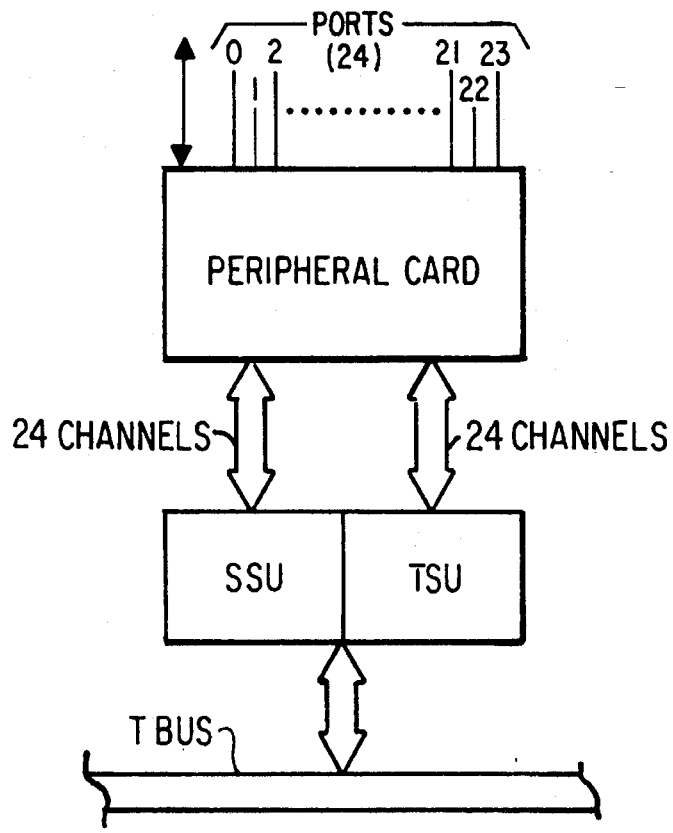
FIG. 2 shows in greater detail the external connections to the Switching Unit through a peripheral card and the Signal Switching Unit (SSU) and the Telephone Switching Unit (TSU).

A peripheral card as shown in FIG. 1. connected to the SSU and TSU is shown in greater detail in FIG. 2. A peripheral card as may be used in the preferred embodiment, is shown as having 24 ports or slots. The signaling and PCM voice data is communicated in 24 channels to the SSU and TSU, and from the SSU and TSU to the T bus. The 64 kbps PCM voice data is transmitted through the TSU directly to other ports on the same peripheral card or through the PCM bus (not shown) to other ports on other peripheral cards through respective TSUs.

As known to those skilled in the art, the information received directly from a port such as any one of the ports 0 through N, may be through a dedicated connection to signaling system protocols (Protocols). These Protocols such Signaling System 7 (SS7) as specified in the ITU-T (CCITT) documents numbered Q.701–Q.704.MTP are used for routing data over high speed signaling links. The data is used to establish and remove circuits for switch telephone calls and to complete transactions to service control points in the SS7 network. The Protocol is also responsible for network maintenance of the signaling links.

Accordingly, it is desirable to provide a capability for receiving Protocols, from dedicated lines for example, directly by a processing unit capable of processing those Protocols and providing the processed information to the CPU for completing or removing links for call transactions, within the telephone switch. For example, a Protocol such as Q.921(PRI layer 2), or X.25 or Frame relay as received, may require processing according to processing programs dedicated for respective Protocols. The Protocol processed information is then transmitted to the CPU for constructing or removing links used for call transactions between the ports or slots connected into the switch as described above. According to the principles of the invention as shown in the preferred embodiment, these processors may be located directly on peripheral cards in the Switching Unit. In this way, the protocol processing units are accessible for installation, removal or modification as required. The protocol processors provided on peripheral cards permit dedicated processing of each received protocol independently of any other protocols and without intervention of the central processing unit.

Figure 3:
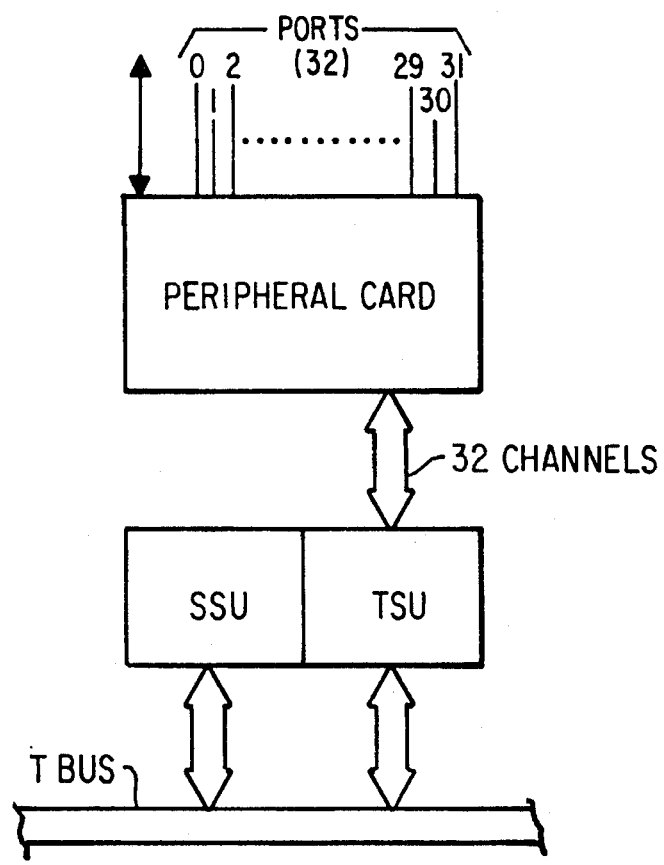
FIG. 3 shows the connections shown in FIG. 2 with thirty-two channels as used in the preferred embodiment for connecting up to thirty-two channels of protocol control information to the Switching Unit.

A schematic of the PCU and associated data paths between the CPU and a peripheral card shelf containing the PCU card is as shown in FIG. 3.

As shown the PCU in the preferred embodiment has 32 ports, 0 to 31, and is located on a peripheral card, communicating with the TSU in the preferred embodiment through 32 channels. Accordingly, the 64 kbps PCM data may be operated at a 2.048 Mbps rate representing the 32 channels at 64 kbps each.

Each of the Switching Unit slot or port connections to the PCU, O through 31, represent designated slot or port within the telephone switch. Within the PCU, each of the PCU slots or connections are dedicated to a Switching Unit port or slot connection by the CPU.

Figure 4:
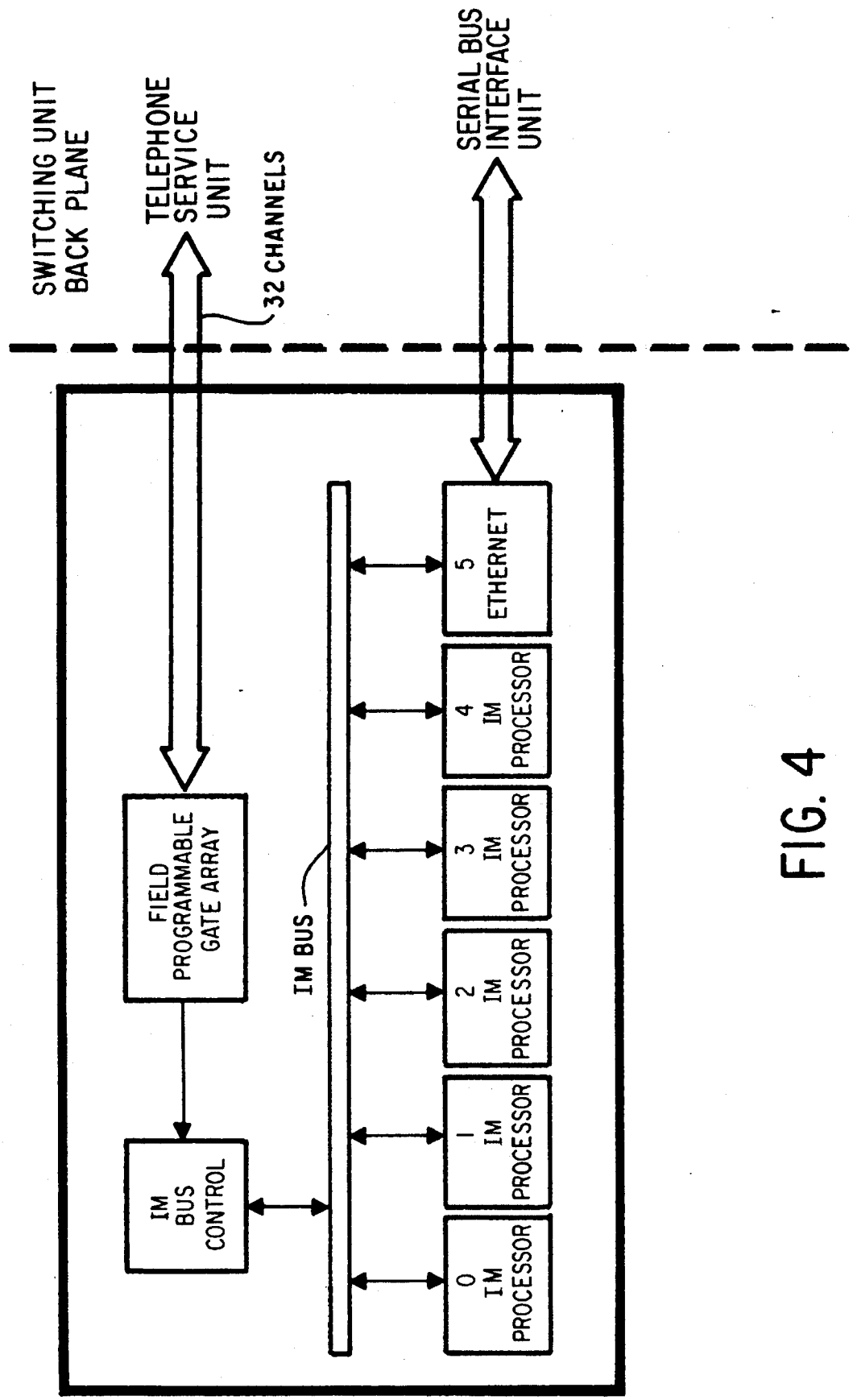
FIG. 4 shows in greater detail a peripheral card containing the Packet Control Unit (PCU), the IMP processors for processing the protocol control information and the ENET processor for transmitting the protocol process control information to the Serial Bus Interface Unit (SBIU) within the Central Processing Unit.

The PCU peripheral card is shown in detail in FIG. 4.

The PCU is directly connected through back plane of the Switching Unit of the telephone switch, to the Switching Unit and to the TSU.

As shown for the PCU in FIG. 4., slots are provided for each of the IMP processors shown in slots 0 through 4 and for the ENET processor shown in slot 5. IM Bus control is through a field programmable gate array. In the preferred embodiment, each IMP reads the information on the IM Bus and each accepts information designated for that respective IMP.

In the preferred embodiment, a telephony bus providing access to 32 ports of 64 kbps serial packet data may be routed to the PCU and on to the PCU 2.048 Mbps IM Bus. Under the addressing control of the telephone switch, each of the designated slots within the PCU shown for an IMP may be given more than one slot or port address and each IMP may be used to process data received from one or more slots or ports, using the technique of time domain multiplexing, as well known to those skilled in the art and not explained in detail.

Accordingly, each IMP may process information received from any slot or port external to the switch over 32 port channels as given by the designated port address registered in the TPU of the CSU.

Figure 5:
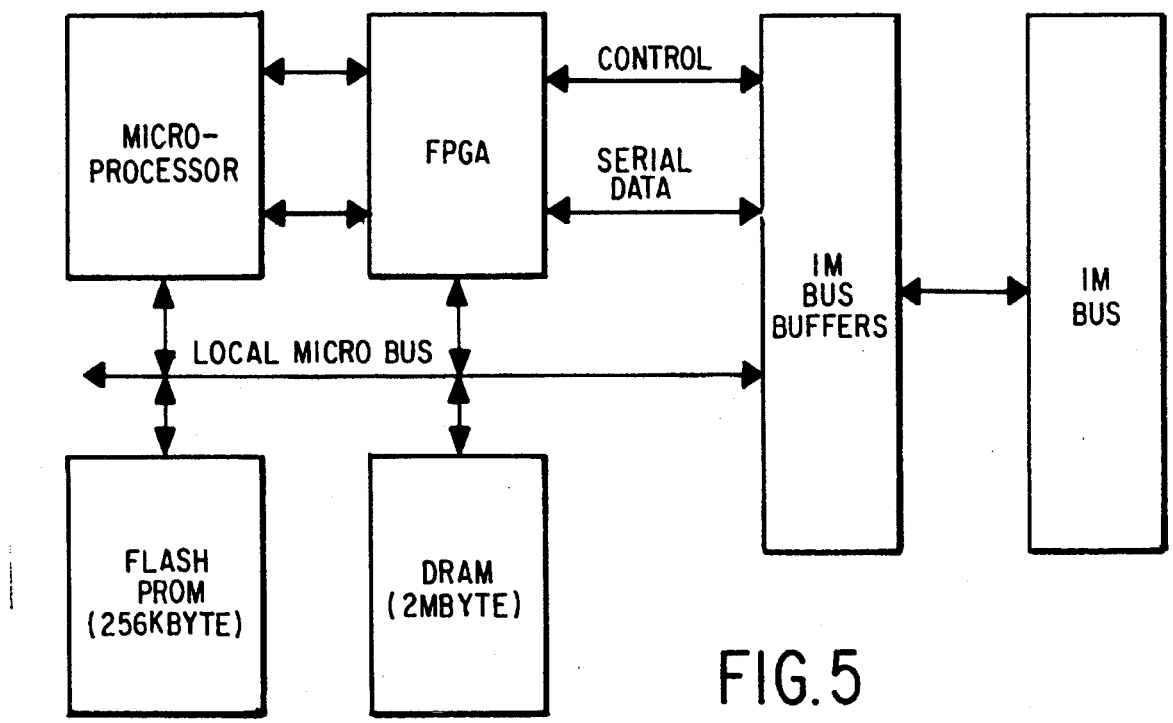
FIG. 5 shows in detail each of the IMP modules within the Packet Control Unit (PCU), for processing protocol control information.
Figure 6:
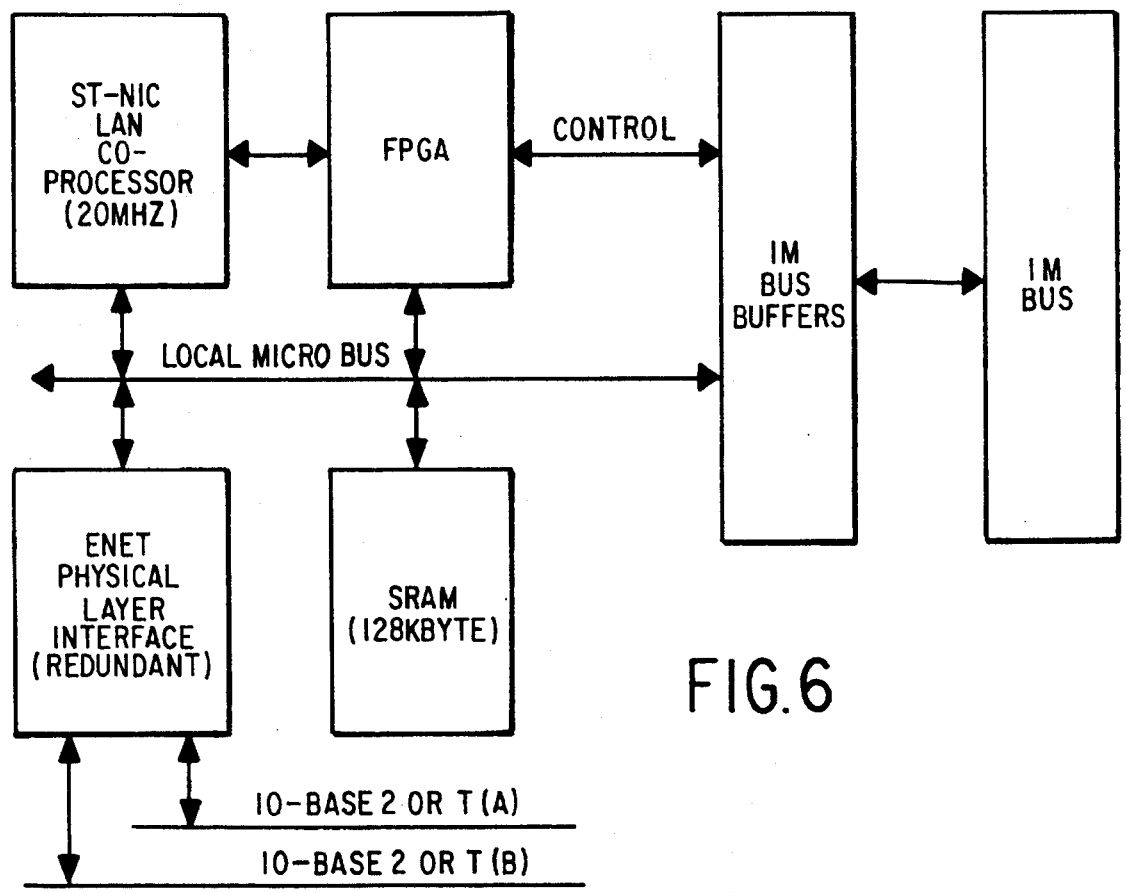
FIG. 6 shows in detail the ENET module located on the Packet Control Unit (PCU).

Each of the IMP processors (IMP) as located within each of the slots shown in FIG. 4. for the PCU is shown in FIG. 5. in greater detail. As shown, an IM bus buffer controls access to the bus for each IMP. Control and serial data information is provided to a field programmable gate array (FPGA) such as a Xilinx 400J-5, and to a microprocessor. In the preferred embodiment, the microprocessor is a 68302 operating at 20 MHz. A local microbus operating and 8 MBytes per second in the preferred embodiment is located within each IMP and provides communications between the microprocessor, the FPGA, a 256 kbyte flash prompt containing a boot program and a 2M byte containing the particular program for a dedicated Protocol.

An operation in accordance with the address instructions provided by the TPU within the CSU to the TSU, a protocol received at a port or slot connection on a peripheral card is routed by addressing instructions provided by the TPU to the TSU and routed to the address corresponding to the IMP contained in the PCU. As would be known to those skilled in the art, each of the IMPs located in each of the slots on the PCU then read the information on the bus and select that protocol which is designated for that respective IMP passing any protocol designated for another IMP. The processed information is placed back on the IM bus within the PCU and routed to the ENET slot where it is transmitted to the SBIU within the CPU over a dedicated LAN. This dedicated link is operated at 10 Mbps and provides direct communication without interrupting any of the communications carried by the R Bus.

The ENET module shown in slot 5 in FIG. 4., includes an IM bus buffer to control the information passed from the IM bus to the ENET module, a FPGA and processor. The FPGA may by a Xilinx 3064 and the processor may be an ST-NIC (network interface processor) LAN Co-processor operated at 20 MHz. An SRAM containing 128 kbytes of information provides the program for processing the information received from the IM bus and transmitted through the ENET physical layer interface to the local area network. As the constructions of ENET processors and the information flow through an ENET LAN is well known, it is not explained in detail.

We claim:

1. A system for processing control information in a switch, comprising:
   a. a first switching means;
   b. a first control means;
   c. said first switching means connected to said first control means;
   d. said first switching means including a plurality of ports for making external connections to said switch and for interconnecting said ports
   e. said first control means producing control information;
   f. said first switching means establishing connections between said ports in response to said control information;
   g. said plurality of ports connected to external connections and arranged to provide protocol control information;
   h. said first switching means including protocol processing means;
   i. said protocol processing means arranged to receive said protocol control information and to produce protocol processed control information;
   j. a first communications buss located between said first switching means and said first control means for transmitting control information from said first control means to said first Switching Unit;
   k. a second communications channel separate from said first communications channel and located between said protocol processing means and said first control means;
   l. said control means arranged to receive said protocol processed control information over said second communications channel and responsive to said protocol processed control information, transmitting control information to said first switch means.

2. The system of claim 1 wherein said switch is a telephone switch.

3. The system of claim 1, wherein said protocol processing means includes a protocol processing bus arranged for connection to said first switching means and a plurality of protocol processors connected to said protocol processing bus.

4. The system of claim 1, wherein: said protocol processing means are arranged for connection to separate respective ports of said plurality of ports to receive said protocol control information and to produce said protocol process control information.

5. In a telephone switch connected to a plurality of sources of protocol control information, a system for processing said protocol control, information comprising:
   a plurality of ports, including a first portion of said ports connected to a plurality of sources of protocol control information external to said telephone switch;
   a switch means connected to said plurality of ports;
   said switch means including protocol control information processing means for receiving protocol control information from said first portion of said ports and producing processed protocol control information;
   a control means connected to said switch means for receiving said processed protocol control information from said protocol control information processing means, to provide switching control information to said switch means;
   said switch means for making selective connections between said plurality of ports in response to said switching control information from said control means;
   said protocol control information processing means connected to said switch means through a second portion of said ports; and
   said switch means for connecting selected ports of said first portion of ports to selected ports of said second portion of ports to connect said protocol control information received from said selected ports of said first portion of ports to selected ports of said second portion of ports.

6. The telephone switch of claim 5, wherein:
   said protocol information processing means includes a plurality of protocol control units for processing designated protocol control information; and
   said switch means for connecting a port in said first portion of said ports connected to a first designated protocol control information, with a port in said second portion of said ports connected to a protocol control unit arranged to process said first designated protocol control information.

7. The system of claim 5, wherein said protocol control information processing means includes:
   at least one protocol control information processing unit containing a plurality of separate protocol processors for processing separate respective protocol control information;
   a bus on said protocol process unit connected to said protocol processing unit and to said switch means for connecting said switch means for connecting protocol control information with said protocol processing unit; and
   each said protocol processor includes means to identify a respective separate protocol control information on said bus for producing processed protocol control information from said separate respective protocol control information.

8. The telephone system of claim 5, including:

a first communication channel connected between said switch means and said control means;

said switch means receiving control information over said first channel from said control means;

a second communication channel connected between said protocol control information processing means and said control means; and said protocol control information processing means includes transmission means for transmitting said processed protocol control information on said second communication channel to said central processor.

9. The telephone system of claim 5, including:

a first channel connected between said control means and said switch means;

a second channel connected between said control means and said protocol control information processing means;

said protocol information processing means including transmission means connected to said second channel for transmitting said processed protocol control information to said control means on said second channel separately from the protocol control information received from said first plurality of ports by said protocol control information means, on said first channel.

10. The telephone system of claim 9, wherein:

said control means, responsive to said processed protocol control information, provides said switching control information.

11. A system for processing control information in a switch, comprising:

a. a first switching means;

b. a first control means;

c. said first switching means connected to said first control means;

d. said first switching means including a plurality of ports for making external connections to said switch and for interconnecting said ports e. said first control means producing control information;

f. said first switching means establishing connections between said ports in response to said control information;

g. a portion of said plurality of ports for making external connections, arranged to receive protocol control information;

h. said first switching means including protocol processing means for receiving said protocol control information and for producing protocol processed control information;

i. a first communications channel located between said first switching means and said first control means for transmitting control information from said first control means to said first switching means;

j. a second communications channel separate from said first communications channel and located between said protocol processing means and said first control means;

k. said first control means connected to receive said protocol processed control information over said second communications channel and responsive to said protocol processed control information, transmitting control information to said first switch means.

12. The system of claim 11 wherein said switch is a telephone switch.

* * * * *